United States Patent
Schweizer et al.

(10) Patent No.: US 7,417,401 B2
(45) Date of Patent: Aug. 26, 2008

(54) METHOD AND DEVICE FOR OPERATING A DRIVE MECHANISM

(75) Inventors: Alexander Schweizer, Buehl (DE); Martin Zimmerman, Sasbach (DE); Jens Martin, Sinzheim-Kartung (DE); Joachim Hirt, Oberkirch (DE); Martin Fuss, Wooster, OH (US); Matthias Ehrlich, Buehl (DE); Frank Stengel, Baden-Baden (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 39 days.

(21) Appl. No.: 11/541,366

(22) Filed: Sep. 29, 2006

(65) Prior Publication Data
US 2007/0087895 A1    Apr. 19, 2007

(30) Foreign Application Priority Data
Oct. 1, 2005    (DE) ..................... 10 2005 047 287

(51) Int. Cl.
*H02P 15/00* (2006.01)
*B60W 10/02* (2006.01)
*B60W 10/10* (2006.01)

(52) U.S. Cl. ............... 318/626; 477/8; 477/15; 477/78; 192/3.54

(58) Field of Classification Search .......... 318/139, 318/560, 600–605, 626, 652; 192/3.51–3.56; 477/7, 8, 15, 166, 179–180, 78
See application file for complete search history.

(56) References Cited

U.S. PATENT DOCUMENTS

| | | | | | |
|---|---|---|---|---|---|
| 4,858,131 | A | * | 8/1989 | Sugimura et al. | 701/68 |
| 5,630,773 | A | * | 5/1997 | Slicker et al. | 477/176 |
| 5,989,153 | A | * | 11/1999 | Fischer et al. | 477/74 |
| 6,033,342 | A | * | 3/2000 | Steinel et al. | 477/181 |
| 6,640,951 | B2 | * | 11/2003 | Bamberger et al. | 192/85 R |
| 6,711,486 | B1 | * | 3/2004 | Karlsson et al. | 701/67 |
| 2002/0007241 | A1 | * | 1/2002 | Kupper et al. | 701/51 |

FOREIGN PATENT DOCUMENTS

DE    103 16 442    10/2003

* cited by examiner

*Primary Examiner*—Bentsu Ro
(74) *Attorney, Agent, or Firm*—Simpson & Simpson, PLLC

(57) ABSTRACT

A method for operating a drive mechanism comprising bringing a mobile element into a predetermined reference position with the help of an engine and setting an absolute position signal to a reference value allocated to a reference position; changing the position of the mobile element with the help of the engine and creating an incremental position measurement signal, depending on the change in position, for the mobile element; controlling the incremental position measurement signal and following the absolute position signal when a change in the incremental position measurement signal occurs; repositioning the mobile element in the reference position with assistance of the engine and determining the position value indicated by the absolute position signal in the reference position; determining a difference value from the position value and the reference value and saving the difference value in a data storage; and, repeating steps b) through e) are performed at least once.

10 Claims, 4 Drawing Sheets

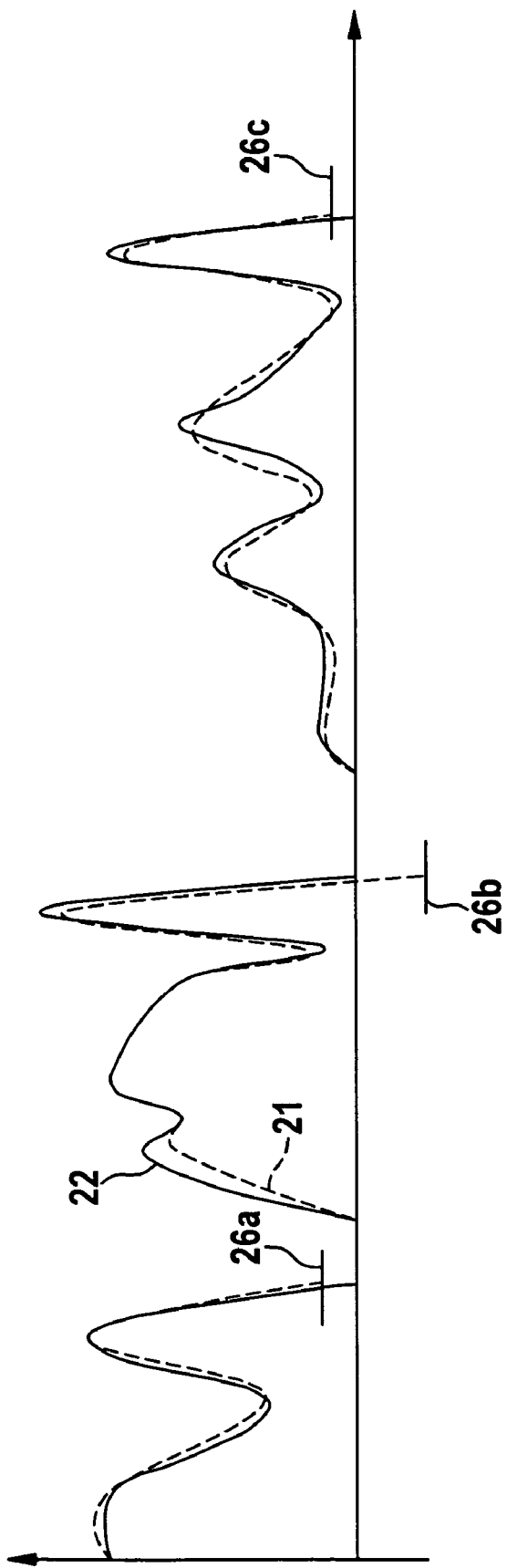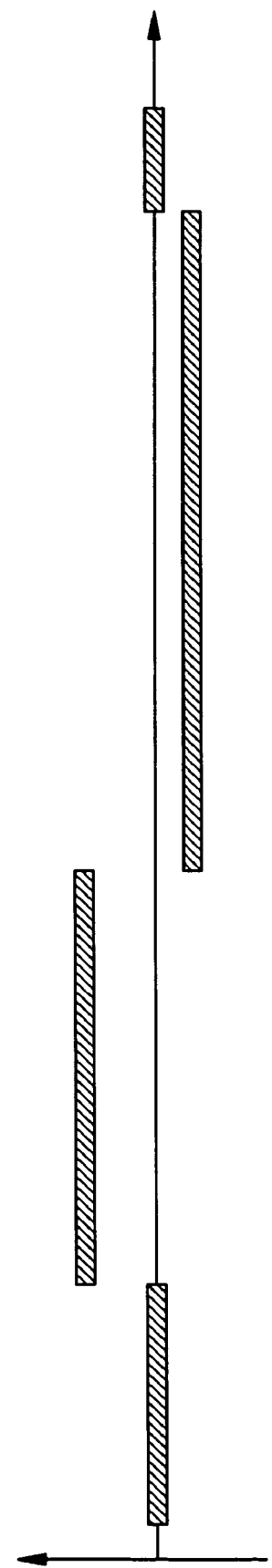

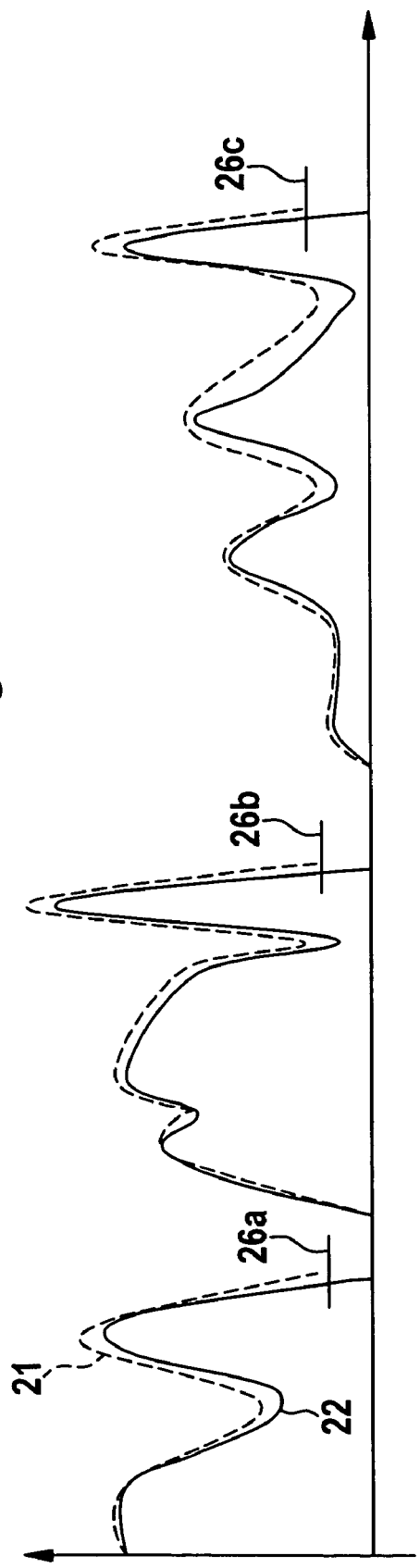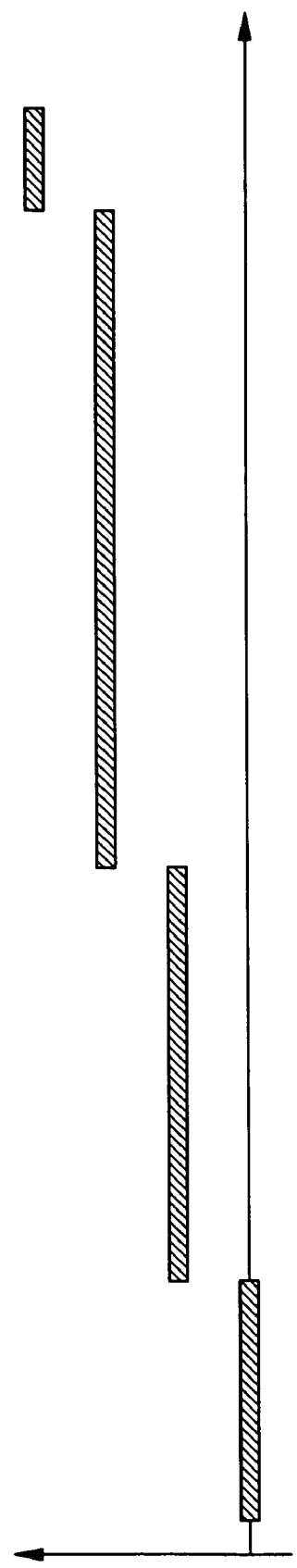

METHOD AND DEVICE FOR OPERATING A DRIVE MECHANISM

CROSS REFERENCE TO RELATED APPLICATIONS

This patent application claims priority of German Patent Application No. 10 2005 047 287.7 filed Oct. 1, 2005, which application is incorporated herein by reference.

FIELD OF THE INVENTION

The invention relates to a method and a device for operating a drive mechanism, in particular for adjusting an automatic transmission and/or a clutch in a motor vehicle, with the drive mechanism being provided with an engine, which is connected in a driving manner to a mobile element to be positioned.

BACKGROUND OF THE INVENTION

Such a method for operating a drive mechanism provided for shifting an automatic transmission is known from DE 103 16 442 A1. The drive mechanism has a brushless electric motor, which shifts a mobile element of the transmission. In order to position the mobile element, the winding of the electric motor is addressed via a control electronic. The rotation of the mobile element is measured by an incremental rotation measurement signal being determined using reverb sensors. The rotation measurement signal is also used to absolutely determine the position of the mobile element. Using the engine, the mobile element is first brought into a known predetermined position. Subsequently, an absolute position signal is set to a reference value allocated to a reference position. Then the mobile element is displaced out of the reference position in order to select a gear requested by the transmission control. The incremental rotation measurement signal is controlled here, in order to follow the absolute position signal with each change of the incremental position measurement signal. During the positioning process of the mobile element the rotation measurement signal is compared to saved rotation signals. If any deviation is determined, a neutral reference shift is initiated. This largely avoids mistakes even during the shifting of the transmission, which might lead to a critical driving condition, damage to the transmission, and/or a dangerous situation when, due to a malfunction, too many or too few increments were measured in the rotation measurement signal. However, by this reasoning an erroneous positioning of the mobile element cannot be detected or avoided in all cases, in particular, when only few increments were missed or counted in excess and the error remains within the range of the mechanical tolerances and the statistic variations of the measurements.

BRIEF SUMMARY OF THE INVENTION

Therefore, the object is to provide a method of the type mentioned at the outset, which can detect highly accurately any faulty positioning of the mobile element, even when only small errors of the position measurement signal have occurred.

This object is attained in that:

a) the mobile element is brought into a predetermined reference position with the help of the engine and an absolute position signal is set to a reference value allocated to a reference position;

b) the position of the mobile element is changed with the help of the engine and an incremental position measurement signal of the position is created for the mobile element depending on the change of the position;

c) the incremental position measurement signal is controlled and the absolute position signal is followed when a change of the incremental position measurement signal occurs;

d) the mobile element is positioned once more with the help of the engine in the reference position and the position value is determined, which is allocated to the absolute position signal in the reference position;

e) a difference is determined from the position value and the reference value and said value is saved in a data storage;

f) the steps b) through e) are performed at least once more;

g) at least two of the difference values resulting in this manner are added to form a control value; and, h) and the control value is compared to a predetermined range of target values and that an error condition is recognized when a deviation occurs between the control value and the range of target values.

Thus, in an advantageous manner the generally always present individual deviations in the cycles, determined in two subsequent reference shifts between the position value of the absolute position signal in the reference position and the reference value, are added to a control value over several cycles. Here, errors are largely compensated, which are caused by noise or by individual cycles being once in the positive, once in the negative range. However, errors always pointing in the same direction lead to a nominal increase of the control value. This way, even small mistakes can initiate the detection of an error condition, if it occurs repeatedly. The control value and/or the difference values are preferably saved in a non-volatile data storage so that it remains saved in a motor vehicle even after turning off the ignition.

The above-mentioned object can also be obtained in that:

a) the mobile element is brought into a predetermined reference position with the help of the engine and that an absolute position signal is set to a reference value allocated to said reference position;

b) the position of the mobile element is changed with the help of the engine and an incremental position measurement signal, dependent on the change of position, is created for the mobile element;

c) the incremental position measurement signal is controlled and the absolute position signal is followed when any changes of the incremental position measurement signal occur;

d) the mobile element is repositioned in the reference position with the help of the engine and that the position value of the absolute position signal in the reference position is determined and saved in a data storage;

e) the steps b) through d) are performed at least one more time;

f) the position values determined in this manner are added to a total value and the difference between the total value and the product of the reference value and the number of added positioning values is determined as a control value; and, g) and the control value is compared to a predetermined range of target values and an error condition is recognized when a deviation of the control value from the range of target values is detected.

In this solution, errors always having the same algebraic sign in the individual cycles cause a nominal increase of the control value as well. Thus, even small mistakes can be detected securely. The total value and the control value are preferably saved in a non-volatile data storage.

In an advantageous embodiment of the invention, the incremental position measurement signal is compared to a saved signal and an error condition is detected when a deviation of the position measurement signal and the saved signal occurs. Here, for example, in an incremental position measurement signal, which performs a predetermined sequence of logical signal levels (e.g., 0 and 1) for an error-free creation of signals, said sequence can be compared to a saved pattern. The positioning of the mobile element is therefore controlled in two different manners, by which errors in positioning can be detected even more securely.

It is advantageous if during and/or after the detection of an error condition the engine becomes blocked. Here, it is assumed that the group of components to be adjusted in the drive mechanism, such as, e.g., an automatic transmission and/or a clutch, is in a secured condition prior to the error being detected and that said condition is to be maintained.

In another beneficial embodiment of the invention, it is assumed that a signal representing a measurement for the reliability of the absolute position signal is provided and that during or after the detection of an error condition said signal is adjusted to a value having a lower reliability allocated. The signal representing a scale for the system confidence can be cyclically controlled and/or at least be called at a predetermined operational condition of the vehicle, in order to initiate a predetermined action, depending on the operational state, such as e.g., a re-initiation of the microcomputer necessary for determining the absolute position signal.

BRIEF DESCRIPTION OF THE DRAWINGS

In the following, an exemplary embodiment of the invention is explained in greater detail using the drawing, in which:

FIG. 2 is a graphic representation of a mechanical position (continuous line) of an adjustable element and an absolute position signal (dot-dash line), with the x-coordinate showing the time and the y-coordinate showing the position;

FIG. 3 is a graphic representation of a control value signal deducted from the position signal shown in FIG. 2;

FIG. 4 is a representation similar to FIG. 2, however, with a systematic error being present during the detection of the position signal;

FIG. 5 is a graphic representation of a control value signal deducted from the position signal shown in FIG. 4; and, FIG. 6 is a flow chart explaining the steps performed during the determination of the signal of the control value.

DETAILED DESCRIPTION OF THE INVENTION

Figure 1:
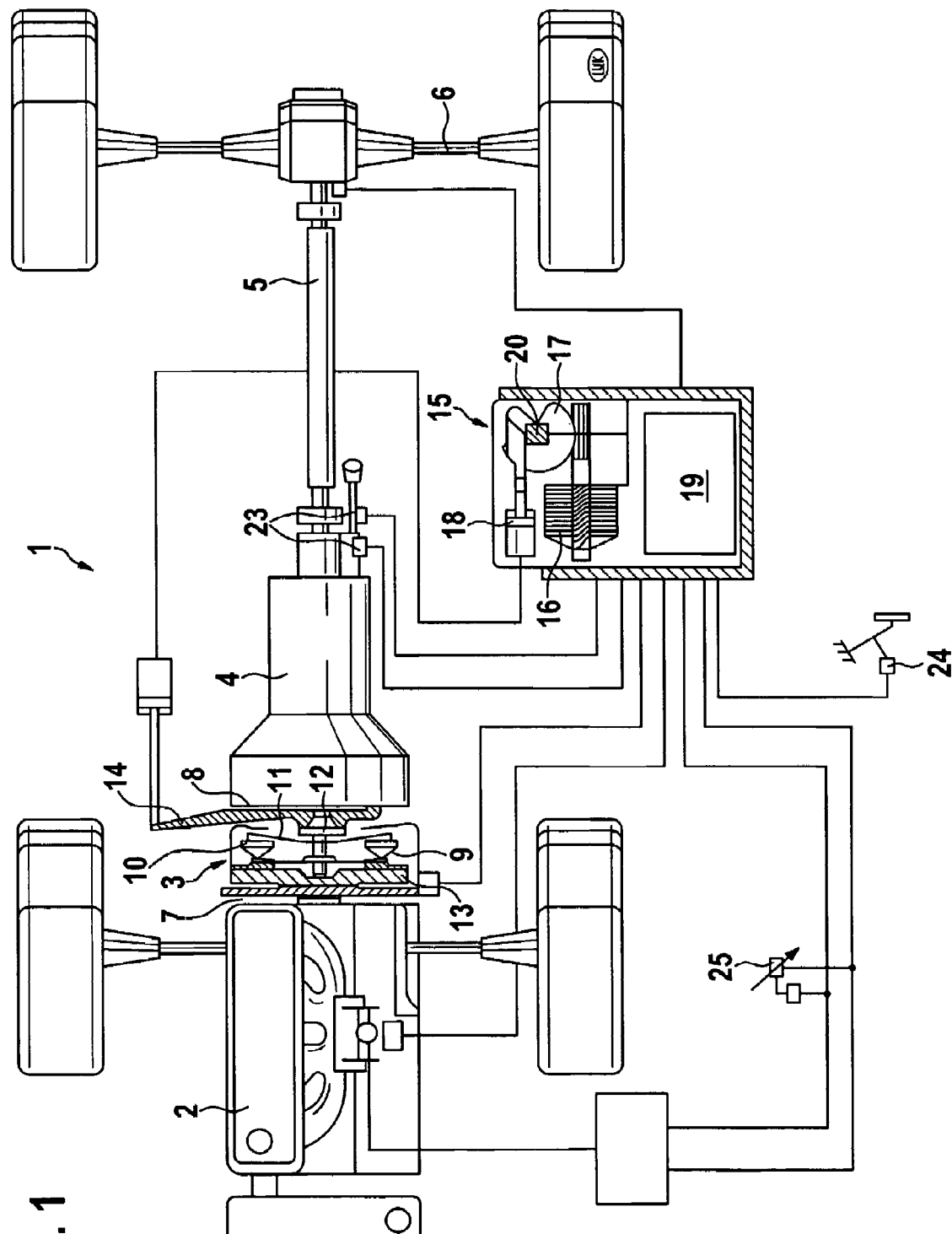
FIG. 1 is a schematic representation of a motor vehicle.

A vehicle marked 1 in its entirety in FIG. 1 has a drive train with a drive unit 2, such as e.g., a motor or an internal combustion engine. Furthermore, clutch 3 and transmission 4 are arranged in the drive train. Clutch 3 is arranged in the power flow between drive unit 2 and transmission 4, with a drive moment of drive unit 2 being transmitted via clutch 3 to transmission 4 and from transmission 4 on the output side to drive shaft 5 and to subsequent axle 6 as well as to the wheels.

Clutch 3 is provided with driving side 7 and power take-off side 8, with a torque being transmitted from driving side 7 to take-off side 8, e.g., by which clutch disc 9 being impinged with force by pressure plate 10, disc spring 11, and clutch release bearing 12, as well as flywheel 13. For this impingement, clutch release lever 14 is operated via actuator 15.

Actuator 15 is provided with engine 16, preferably an electronically commutating electric motor, which is connected via transmission 17 to mobile element 18, namely a master cylinder of a hydraulic operating device for a clutch. The device is connected to clutch release lever 14 in the drive connection. The control of engine 16 occurs via control device 19, provided with a control electronic, which is connected via a final stage to a winding of engine 16.

The motion of mobile element 18 is incrementally detected via clutch-path sensor 20. For this purpose, several reverb sensors can be arranged, e.g., at the stator of engine 16, offset in reference to one another in the circumferential direction, which cooperate with permanently magnetic poles provided at the rotor of engine 16. Each time a magnetic pole is passed, the respective reverb sensor creates an electric impulse.

The force impingement of pressure plate 10 and/or the friction surfaces can be adjusted in a controlled manner according to a provided target value signal via the position of mobile element 18. Here, pressure plate 10 can be arbitrarily positioned between two end positions and be fixed in the respective location. One of the end positions is equivalent to a fully inserted clutch position and the other end position to a fully extended clutch position.

In order to adjust a torque transmitted by transmission 3, a position of pressure plate 10 can be controlled, which is located in an intermediate area between the two end positions. For this purpose, mobile element 18 is positioned in an appropriate location with the help of actuator 15.

In order to allow clutch 3 to be brought into the position required for the torques to be transmitted, an absolute position signal is created indicating the position of the mobile element. For this purpose, in a first step mobile element 18 is brought into a predetermined reference position with the help of engine 16. This can be achieved, for example, such that mobile element 18 is positioned in a locally fixed position abutting a mechanical stop and that contacting the stop can be detected.

In order to detect the stop, the measurement signal of sensor 20 of the clutch path can be evaluated. If during the control of engine 16 in the direction of the stop the measuring signal remains constant, the stop is detected. Of course, it is also possible to detect the positioning of mobile element 18 abutting the stop independent from the measurement signal of sensor 20 of the clutch path with the help of a separate sensor of the reference position, such as, e.g., an end switch.

As soon as it was detected that the reference position has been reached an absolute positioning signal provided is set to a reference value allocated to the reference position, for example to the value 0.

Now the position of mobile element 18 is changed with the help of an engine, for example, in order to appropriately adjust the position of pressure plate 10 when a change in the target value signal occurs for the impingement of force to pressure plate 10. The incremental position measurement signal is controlled and, when a change of the incremental position measurement signal occurs, the absolute position signal is appropriately followed.

In FIG. 2, a potential progression of the measured absolute position signal is shown exemplarily by dot-dash line 21. Additionally, the actual mechanical position of mobile element 18 is marked by continuous line 22. It is clearly discernible that line 21 of the position signal only slightly deviates from line 22 for the mechanical position.

The operational condition of motor vehicle 1 is controlled with the help of sensors 23, 24, and 25. In FIG. 1, in an exemplary manner, two sensors 23 are shown for determining the position of the shift lever and sensor 24 for determining the position of a brake pedal and idling switch 25.

If the operational state of motor vehicle 1 permits it, mobile element 18 can be repositioned in the reference position with the help of engine 16. This can be achieved, for example, when no gear is engaged in transmission 4 and thus the transfer of force between drive unit 2 and axle 6 is interrupted.

As soon as the reference position has been detected, first positioning value 26a is determined for the absolute position signal. As discernible in FIG. 2, first position value 26a can deviate from the reference position, for example, due to mechanical tolerances and/or quantization noise.

Now the difference between first position value 26a and the reference value is determined and saved as a control value in the data storage not shown in greater detail in the drawing (FIG. 3). When the reference value equals zero, the position value 26a can be saved directly in the data storage. Additionally, the absolute position signal is set to the reference value allocated to the reference position, thus e.g., to the value 0.

Now, the position of mobile element 18 is modified once more with the help of engine 16, in order to position pressure plate 10 according to the target value signal for the impingement with force.

If permitted by the operational state of motor vehicle 1, mobile element 18 is positioned once more in the reference position with the help of engine 16, in order to determine second position value 26b for the absolute position signal. The difference between second position value 26b and the reference value is determined and added to the control value saved in the data storage. The result of this addition is saved as the new control value (FIG. 3) in the data storage. The absolute position signal is again set to the reference value allocated to the reference position (FIG. 2).

If necessary, the position of mobile element 18 can be modified again with the help of engine 16 and the mobile element can then be positioned in the reference position in order to determine at least third position value 26c and to continue the control value in the respective manner. In FIG. 3, it is discernible that the individual differences between position values 26a, 26b, 26c, on the one hand, and the reference value, on the other hand, show different algebraic signs and therefore the added control value has only small numeric values.

FIGS. 4 and 5 show the mechanical position of mobile element 18, the absolute positioning signal, and the control value signal for a drive mechanism, in which a systematic error occurs when the absolute position signal is measured, leading to individual differences between positioning values 26a, 26b, 26c, on the one hand, and the reference value, on the other hand, always having the same algebraic sign. It is clearly discernible that the control value increases numerically in each comparison of positions.

Figure 6:
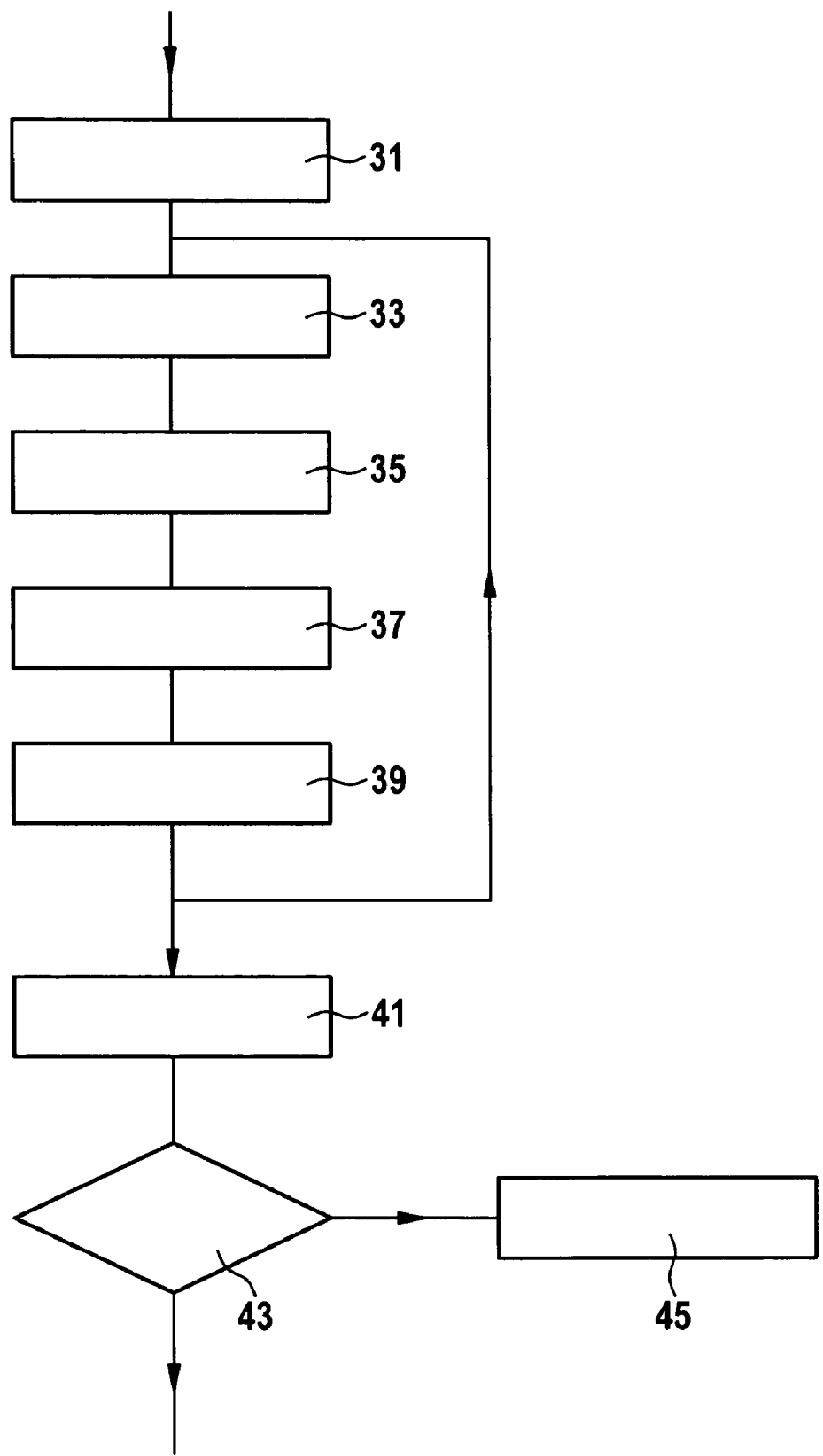

In order to detect this error, the control value and/or the control value signal is compared to a predetermined target value range. In FIG. 6, in processing step 43, it is discernible that an error condition is detected when a deviation of the control value and/or the control value signal to the target value range occurs, which sets a signal representing a measurement for the reliability of the absolute position signal to a value allocated to a lower reliability. As soon as the operational state of motor vehicle 1 allows, reference shifting is performed, in which the absolute position signal is compared to the reference position and/or an entry is made in the error recording file.

Thus, the invention relates to a method for operating a drive mechanism comprising the following steps:

a) In processing step 31, a mobile element is brought into a predetermined reference position and an absolute position signal is set to a reference value.

b) In processing step 33, the position of the mobile element is modified and an incremental position measurement signal is created depending on the change of position.

c) In processing step 35, the position measurement signal is controlled and the absolute position signal is followed when any change occurs.

d) In processing step 37, the mobile element is again repositioned in the reference position and the position value is determined that is shown by the absolute positioning signal in the reference position.

e) In processing step 39, a difference value is determined from the position value and the reference value and saved in the data storage.

f) Steps b) through e) and/or processing steps 33 through 39 are performed at least one more time.

g) In processing step 41, at least two of the difference values created this way are added to a control value.

h) In processing step 43, the control value is compared to a predetermined target value range and error state 45 is determined, when a deviation occurs between the control value and the target value range.

Another embodiment is identical to the previous one in processing steps 31 through 37. In processing step 39, a difference value is also determined from the position value and the reference value. The loop described in step f) is omitted. In processing step 41, the actual control value is formed by adding the difference value to the previous control value. In processing step 43, the control value is compared to the predetermined target value range and an error state is detected when a deviation occurs between the control value and the target value range. It is understood that in this comparison the control value must be weighed by the number of added difference values. Subsequently the method returns to processing step 33.

LIST OF REFERENCE CHARACTERS

1 Motor vehicle
2 Drive mechanism
3 Clutch
4 Transmission
5 Drive shaft
6 Axle
7 Driving side
8 Take-off side
9 Coupling disc
10 Pressure plate
11 Disc spring
12 Clutch release bearing
13 Fly wheel
14 Clutch release lever
15 Actuator
16 Engine
17 Transmission
18 Mobile element
19 Control unit
20 Clutch path sensor
21 Line
22 Line
23 Sensor for determining the shift position of the lever
24 Sensor for determining the position of the brake pedal
25 Idling switch
26a First position value
26b Second positioning value
26c Third positioning value
31 Processing step
33 Processing step 35 Processing step
37 Processing step
39 Processing step
41 Processing step
43 Processing step
45 Processing step

What is claimed is:

1. A method for operating a drive mechanism for shifting an automatic transmission and/or a clutch in a motor vehicle (1), with the motor vehicle being provided with a control device (19), by which at least a control of the drive mechanism and a determination of measurement data of a transmission path sensor and/or a clutch path sensor (20) for determining the position of the transmission and/or the clutch occurs, with the drive mechanism having an engine (16), being connected in a driving manner to a mobile element (18) to be positioned, comprising the steps of:
   a) bringing the mobile element (18) into a predetermined reference position with the help of the engine (16) and setting an absolute position signal to a reference value allocated to a reference position;
   b) changing the position of the mobile element (18) with the help of the engine (16) and creating an incremental position measurement signal, depending on the change in position, for the mobile element (18);
   c) controlling the incremental position measurement signal and following the absolute position signal when a change in the incremental position measurement signal occurs;
   d) repositioning the mobile element (18) in the reference position with the help of the engine (16) and determining the position value indicated by the absolute position signal in the reference position;
   e) determining a difference value from the position value and the reference value and saving said difference value in a data storage; and,
   f) repeating steps b) through e) are performed at least one more time;
   g) wherein at least two of the difference values created in this manner are added to a control value;
   h) wherein the control value is compared to a predetermined target value range and an error state is detected when deviations occur between the control value and the target value range.

2. The method according to claim 1, wherein the incremental position measurement signal is compared to the saved signal, and an error state is detected when a deviation occurs between the position measurement signal and the saved signal.

3. The method according to claim 1, wherein during and/or after the detection of an error state the control of the engine (16) is blocked.

4. The method according to claim 1, wherein a signal is provided, which shows the reliability of the absolute position signal, and that during or after the error state has been detected said signal is set to a value allocated to a lower reliability.

5. A method for operating a drive mechanism for shifting an automatic transmission and/or a clutch for a motor vehicle (1), with the motor vehicle being provided with a control device (19), by which at least a control of the drive mechanism and the detection of measurements of a transmission path sensor and/or a clutch path sensor (20) occurs for determining the position of the transmission and/or the clutch, with the drive mechanism being provided with an engine (16) being drive connected to the mobile element (18) to be positioned, comprising the steps of:
   a) bringing the mobile element (18) into a predetermined reference position with the help of the engine (16) and setting an absolute position signal to a reference value allocated to a reference position;
   b) changing the position of the mobile element (18) with the help of the engine (16) and creating an incremental position measurement signal, dependent on the change of position, for the mobile element;
   c) controlling the incremental position measurement signal and following the absolute position signal when a change of the incremental position measurement signal occurs;
   d) positioning the mobile element (18) once more in the reference position with the help of the engine (16) and the position value indicated by the absolute position signal in the reference position is determined and saved in a data storage; and,
   e) repeating steps b) through d) at least one more time;
   f) wherein the position values determined in this manner are added to a total value and the difference between the total value and the product of the reference value and the number of added position values is determined as the control value;
   g) wherein the control value is compared to the predetermined target value range and an error state is detected when a deviation occurs between the control value and the target value range.

6. The method according to claim 5, wherein the incremental position measurement signal is compared to the saved signal, and an error state is detected when a deviation occurs between the position measurement signal and the saved signal.

7. The method according to claim 5, wherein during and/or after the detection of an error state the control of the engine (16) is blocked.

8. The method according to claim 5, wherein a signal is provided, which shows the reliability of the absolute position signal, and that during or after the error state has been detected said signal is set to a value allocated to a lower reliability.

9. A device for operating a drive mechanism for adjusting an automatic transmission and/or a clutch of a motor vehicle (1) with the motor vehicle having a control device (19), by which at least a control of the drive mechanism and the collection of measurements of a transmission path sensor and/or a clutch path sensor (20) occurs for determining the position of the transmission and/or the clutch, with the drive mechanism being provided with an engine (16), which is in a drive connection to the mobile element (18) to be positioned, characterized in that the device is operatively arranged to execute a method comprising the following steps:
   a) bringing the mobile element (18) into a predetermined reference position with the help of the engine (16) and setting an absolute position signal to a reference value allocated to a reference position;
   b) changing the position of the mobile element (18) with the help of the engine (16) and creating an incremental position measurement signal, depending on the change in position, for the mobile element (18);
   c) controlling the incremental position measurement signal and following the absolute position signal when a change in the incremental position measurement signal occurs;
   d) repositioning the mobile element (18) in the reference position with the help of the engine (16) and determining the position value indicated by the absolute position signal in the reference position;

e) determining a difference value from the position value and the reference value and saving said difference value in a data storage; and, f) repeating steps b) through e) are performed at least one more time;

g) wherein at least two of the difference values created in this manner is added to a control value;

h) wherein the control value is compared to a predetermined target value range and an error state is detected when deviations occur between the control value and the target value range.

10. A device for operating a drive mechanism for adjusting an automatic transmission and/or a clutch of a motor vehicle (1) with the motor vehicle having a control device (19), by which at least a control of the drive mechanism and the collection of measurements of a transmission path sensor and/or a clutch path sensor (20) occurs for determining the position of the transmission and/or the clutch, with the drive mechanism being provided with an engine (16), which is in a drive connection to the mobile element (18) to be positioned, characterized in that the device is operatively arranged to execute a method comprising the following steps:

a) bringing the mobile element (18) into a predetermined reference position with the help of the engine (16) and setting an absolute position signal to a reference value allocated to a reference position;

b) changing the position of the mobile element (18) with the help of the engine (16) and creating an incremental position measurement signal, dependent on the change of position, for the mobile element;

c) controlling the incremental position measurement signal and following the absolute position signal when a change of the incremental position measurement signal occurs;

d) positioning the mobile element (18) once more in the reference position with the help of the engine (16) and the position value indicated by the absolute position signal in the reference position is determined and saved in a data storage; and, e) repeating steps b) through d) at least one more time;

f) wherein the position values determined in this manner are added to a total value and the difference between the total value and the product of the reference value and the number of added position values is determined as the control value;

g) wherein the control value is compared to the predetermined target value range and an error state is detected when a deviation occurs between the control value and the target value range.

* * * * *